(12) United States Patent
Zhao et al.

(10) Patent No.: US 12,410,887 B2
(45) Date of Patent: Sep. 9, 2025

(54) COMPOSITE PRESSURE VESSEL ASSEMBLY AND METHOD OF MANUFACTURING

(71) Applicant: RTX Corporation, Arlington, VA (US)

(72) Inventors: Wenping Zhao, Glastonbury, CT (US);
Paul F. Croteau, Columbia, CT (US);
Andrzej Ernest Kuczek, Bristol, CT (US); Ellen Y. Sun, South Windsor, CT (US); John P. Wesson, West Hartford, CT (US)

(73) Assignee: RTX CORPORATION, Arlington, VA (US)

( * ) Notice: Subject to any disclaimer, the term of this patent is extended or adjusted under 35 U.S.C. 154(b) by 413 days.

(21) Appl. No.: 15/779,146

(22) PCT Filed: Nov. 25, 2015

(86) PCT No.: PCT/US2015/062658
§ 371 (c)(1),
(2) Date: May 25, 2018

(87) PCT Pub. No.: WO2017/091224
PCT Pub. Date: Jun. 1, 2017

(65) Prior Publication Data
US 2018/0347755 A1 Dec. 6, 2018

(51) Int. Cl.
*F17C 1/06* (2006.01)
*F17C 1/16* (2006.01)
(Continued)

(52) U.S. Cl.
CPC .................. *F17C 1/06* (2013.01); *F17C 1/16* (2013.01); *F17C 13/00* (2013.01); *F17C 13/04* (2013.01);
(Continued)

(58) Field of Classification Search
CPC ...... F17C 1/06; F17C 1/16; F17C 2201/0152; F17C 2203/0631; F17C 2203/0629;
(Continued)

(56) References Cited

U.S. PATENT DOCUMENTS 5,441,219 A * 8/1995 Rauscher, Jr. ........ B29C 53/822
220/562
5,577,630 A 11/1996 Blair et al.
(Continued)

FOREIGN PATENT DOCUMENTS

CN 1353801 A 6/2002
CN 104254437 A 12/2014
(Continued)

OTHER PUBLICATIONS

Chinese Office Action for Application No. 201580084272.7 dated Dec. 3, 2019; 11 pages.
(Continued)

*Primary Examiner* — Nathan J Jenness
*Assistant Examiner* — Jennifer Castriotta
(74) *Attorney, Agent, or Firm* — CANTOR COLBURN LLP

(57) ABSTRACT

A composite pressure vessel assembly includes a first and second vessels aligned side-by-side. Each vessel has a liner defining respective chambers. First and second mid-layers of the assembly cover the respective liners with portions of the respective mid-layers being in contact with one-another. An outer layer of the vessel assembly is in contact with and substantially envelops both mid-layers except for the mid-layer portions.

8 Claims, 6 Drawing Sheets

(51) Int. Cl.
*F17C 13/00* (2006.01)
*F17C 13/04* (2006.01)
*F17C 11/00* (2006.01)

(52) U.S. Cl.
CPC ..... *F17C 11/007* (2013.01); *F17C 2201/0152* (2013.01); *F17C 2201/0171* (2013.01); *F17C 2203/0604* (2013.01); *F17C 2203/0629* (2013.01); *F17C 2203/0631* (2013.01); *F17C 2203/0636* (2013.01); *F17C 2203/066* (2013.01); *F17C 2203/0663* (2013.01); *F17C 2203/0673* (2013.01); *F17C 2205/013* (2013.01); *F17C 2209/2118* (2013.01); *F17C 2209/2127* (2013.01); *F17C 2221/012* (2013.01); *F17C 2221/031* (2013.01); *F17C 2221/033* (2013.01); *F17C 2221/035* (2013.01); *F17C 2260/012* (2013.01); *F17C 2260/013* (2013.01); *F17C 2270/02* (2013.01)

(58) Field of Classification Search
CPC ........ F17C 2205/013; F17C 2203/0607; F17C 2203/0621; F17C 2203/0658; F17C 2203/066; F17C 2203/0663; F17C 2203/0665; F17C 2203/0668; F17C 2203/067; F17C 2203/0673; F17C 2203/0675

See application file for complete search history.

(56) References Cited

U.S. PATENT DOCUMENTS

| 6,095,367 A | * | 8/2000 | Blair | B60K 15/03006 |
| | | | | 220/581 |
| 2004/0055897 A1 | * | 3/2004 | Lessing | H01M 8/04208 |
| | | | | 205/765 |
| 2007/0246461 A1 | * | 10/2007 | Shimada | F17C 13/084 |
| | | | | 220/4.12 |

FOREIGN PATENT DOCUMENTS

| CN | 107257899 A | 10/2017 |
| KR | 1020120095511 A | 8/2012 |
| WO | 0005535 A1 | 2/2000 |
| WO | 2016057024 A1 | 4/2016 |

OTHER PUBLICATIONS

International Search Report from the International Searching Authority for International Application No. PCT/US2015/062658; Date of Completion: Jun. 28, 2016; Date of Mailing: Jul. 7, 2016; 5 Pages.
Written Opinion from the International Searching Authority for International Application No. PCT/US2015/062658; International Filing Date: Nov. 25, 2015; Date of Mailing: Jul. 7, 2016; 6 Pages.

\* cited by examiner

COMPOSITE PRESSURE VESSEL ASSEMBLY AND METHOD OF MANUFACTURING

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS REFERENCE TO RELATED APPLICATIONS

This application is a 371 of International Application No. PCT/US2015/062658, filed Nov. 25, 2015, which is incorporated by reference in its entirety herein.

BACKGROUND

The present disclosure relates to a pressure vessel assembly and more particularly to a hybrid composite pressure vessel assembly.

Pressure vessels may serve as storage media (e.g. gas) for a wide variety of consumer, commercial, and industrial processes. In order to store sufficient mass of gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessel and the complicated shapes makes manufacturing challenging. In addition, manufacturing needs to consistently provide reliable, high-volume, lightweight and low-cost constructions.

SUMMARY

A composite pressure vessel assembly according to one, non-limiting, embodiment of the present disclosure includes a first vessel including a first liner defining a first chamber, and a first mid-layer substantially enveloping the first liner; a second vessel including a second liner defining a second chamber, and a second mid-layer substantially enveloping the second liner, and wherein the first and second vessels are aligned side-by-side with a portion of the first mid-layer in contact with a portion of the second mid-layer; and an outer layer being in contact with and substantially enveloping the first and second mid-layers except for the portions of the first and second mid layers.

In addition to the foregoing embodiment, each of the first and second liners include a lobe having at least one interior wall and at least one curved wall, and wherein the portions of the first and second mid-layers cover the respective interior walls.

In the alternative or additionally thereto, in the foregoing embodiment, each of the first and second liners include a plurality of end caps disposed at the ends of the lobes.

In the alternative or additionally thereto, in the foregoing embodiment, the first and second liners are made of formable structural polymer material.

In the alternative or additionally thereto, in the foregoing, embodiment, the first and second liners are selected from the group comprising blow molded and injection molded.

In the alternative or additionally thereto, in the foregoing embodiment, the first and second liners are metallic.

In the alternative or additionally thereto, in the foregoing embodiment, the composite pressure vessel assembly includes a plurality of junctions disposed where the respective ends of the curved walls and interior walls of the first and second liners meet for distributing stress.

In the alternative or additionally thereto, in the foregoing embodiment, the plurality of junctions are Y-shaped junctions and made of the same material as the outer layer.

In the alternative or additionally thereto, in the foregoing embodiment, the plurality of junctions each include an optimized angle other than 120 degrees and dependent upon an effective stiffness of the interior walls and adjacent portions of the mid-layers.

In the alternative or additionally thereto, in the foregoing embodiment, the first and second mid layers are made of resin and a material selected from the group comprising continuous fiber wrapping, winded filaments, automated fiber placement, braiding and a mixture of continuous and non-continuous fiber.

In the alternative or additionally thereto, in the foregoing embodiment, the outer layer is made of sprayed chop fiber and resin.

In the alternative or additionally thereto, in the foregoing embodiment, the resins of the mid-layer and the outer layer are selected from a group comprising epoxy and vinyl ester.

In the alternative or additionally thereto, in the foregoing embodiment, the mid-layer and the outer layer include fibers made of a material selected from a group comprising carbon, glass, and aramid.

A method of manufacturing a composite pressure vessel assembly according to another, non-limiting, embodiment includes wrapping a first liner with at least a first continuous fiber; wrapping a second liner with at least a second continuous fiber; placing the first and second liners side-by-side such that a portions of the at least first and second continuous fibers are in contact with one-another; and applying a non-continuous fiber and resin over the at least first and second continuous fibers except for the portions.

Additionally to the foregoing embodiment, the method includes filling a plurality of Y-shaped junctions with the non-continuous fiber and resin.

In the alternative or additionally thereto, in the foregoing embodiment, the method includes placing the assembly in a pressure mold; and internally pressurizing the first and second liners to thermally form the pressure vessel assembly.

In the alternative or additionally thereto, in the foregoing embodiment, the method includes blow molding plastic to produce the first and second liners.

In the alternative or additionally thereto, in the foregoing embodiment, the non-continuous fiber and resin are spray applied.

In the alternative or additionally thereto, in the forgoing embodiment, the non-continuous fiber and resin is a sheet molding compound.

A method of manufacturing a composite pressure vessel assembly according to another, non-limiting, embodiment includes wrapping a first liner with at least a first continuous fiber; wrapping a second liner with at least a second continuous fiber; placing the first and second liners side-by-side such that a portion of the at least first and second continuous fibers are in contact with one-another; applying a non-continuous fiber over the at least first and second continuous fibers except for the portions, placing the assembly in a mold; injecting the mold with a liquid resin to impregnate the at least a first continuous fiber, the at least a second continuous fiber, and the non-continuous fiber; and applying heat to cure the liquid resin.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The detailed description explains embodiments of the invention, together with advantages and features, by way of example with reference to the drawings.

DETAILED DESCRIPTION OF THE INVENTION

Figure 1:
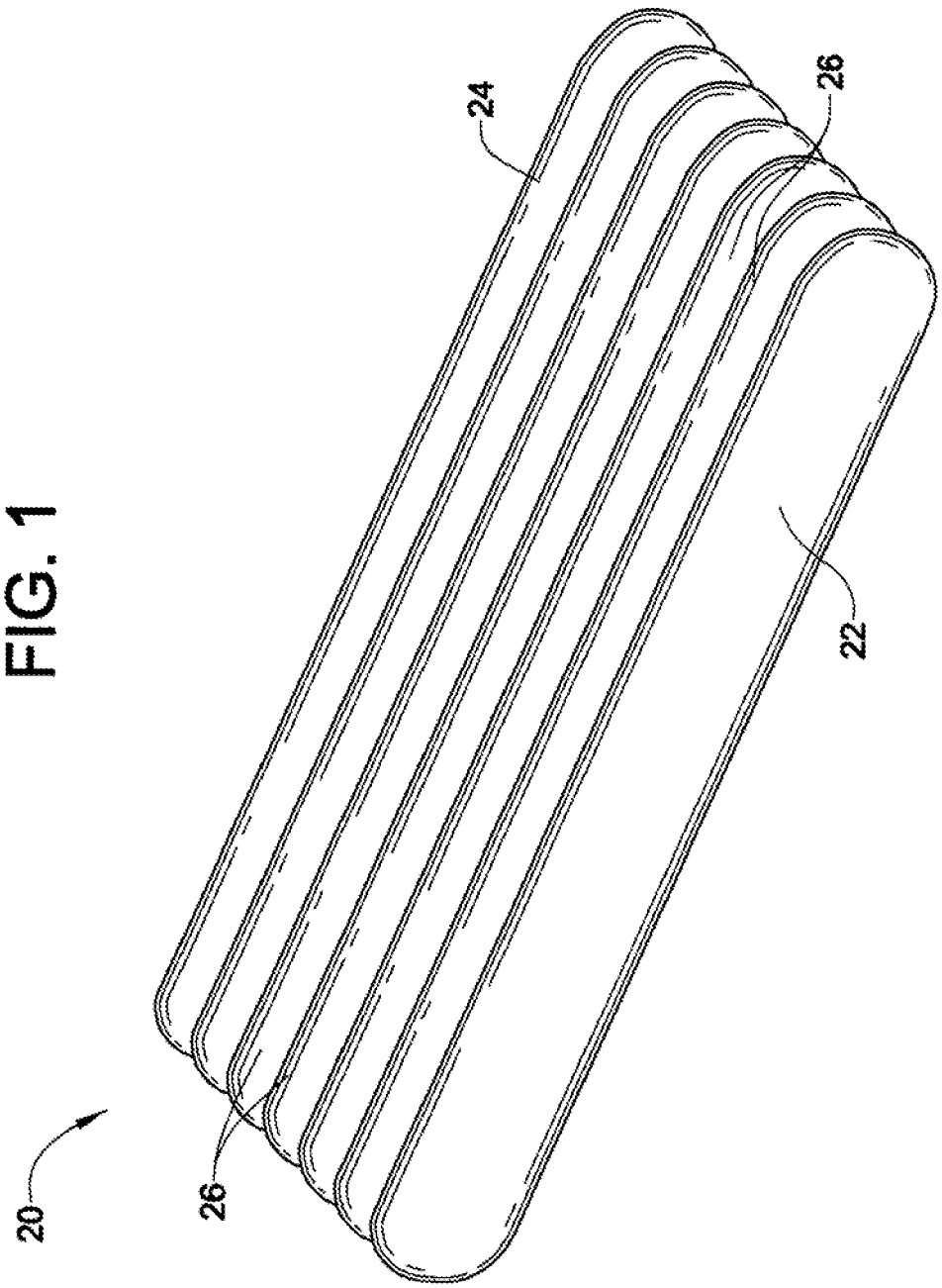
FIG. 1 is a perspective view of a pressure vessel assembly configured to store a pressurized fluid according to an exemplary embodiment of the invention.

Referring, now to FIG. 1, an example of a pressure vessel or tank assembly 20 configured to store a high pressure fluid is illustrated. Exemplary fluids that may be stored within the pressure vessel 20 include, but are not limited to, compressed natural gas (CNG), hydrogen, propane, methane, air, and hydraulic fluid, for example. The pressure vessel assembly 20 may generally include two flanking vessels 22, 24 and at least one interior vessel 26 (e.g., five identical interior vessels illustrated) joined to and disposed between the flanking vessels 22, 24. Each vessel 22, 24, 26 may generally be elongated with the overall configuration of the pressure vessel assembly 20 generally being a rectangular shape, but as will be appreciated from the description, herein, other shapes are contemplated.

Figure 2:
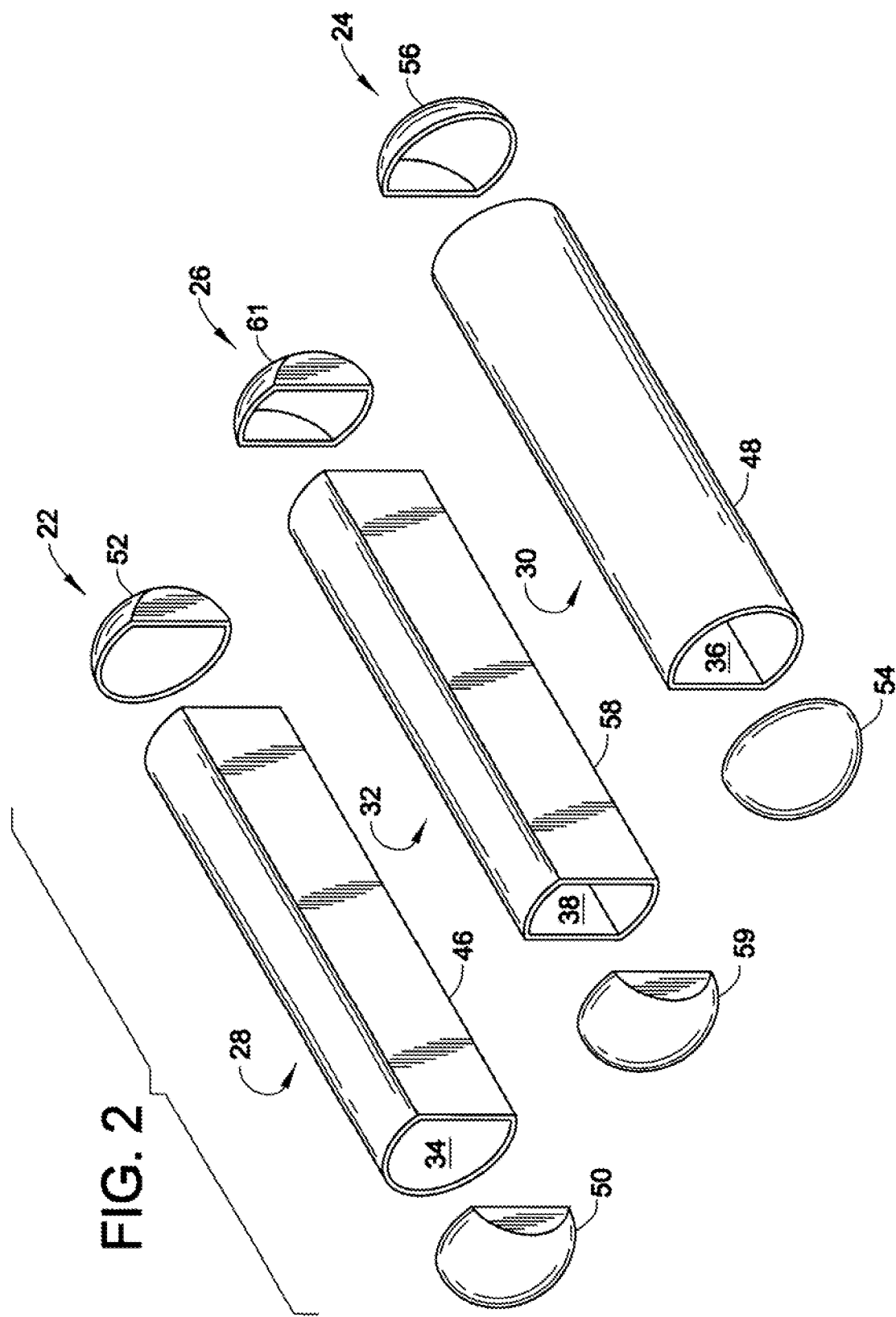
FIG. 2 is an exploded perspective view of liners of the pressure vessel assembly.
Figure 3:
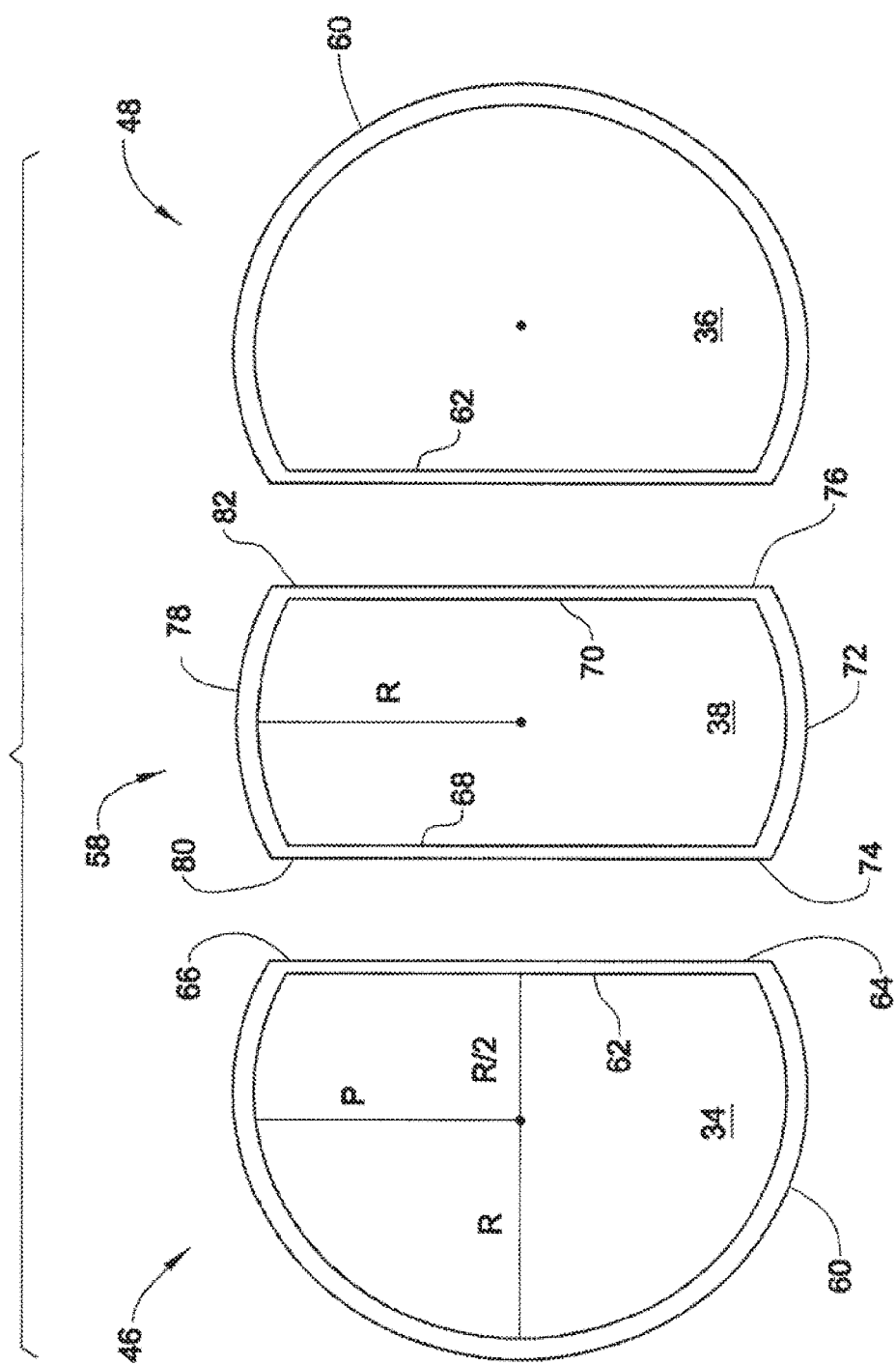
FIG. 3 is a cross section of the liners.

Referring to FIGS. 2 and 3, each vessel 22, 24, 26 may include respective liners 28, 30, 32. Each liner 28, 30, 32 may define the boundaries of respective chambers 34, 36, 38 for the fluid storage, and that may be interconnected (not shown). The flanking end liners 28, 30 may include respective lobes 46, 48 with lobe 46 closed-off by opposite end caps 50, 52 and lobe 48 closed-off by opposite end caps 54, 56. Each lobe 46, 48 may be circumferentially continuous and substantially cylindrical. The interior liner 32 may include a lobe 58 with the lobe 58 closed-off by opposite end caps 59, 61. Lobe 58 may be circumferentially continuous. The liners 28, 30, 32 may be made of any material and thicknesses capable of providing the necessary structural support, weight, operating characteristics, cost limitations and other parameters necessary for a particular application. Examples of liner material may include steel or other metallic compositions and plastic such as thermoplastic, thermoset plastic or other formable structural polymer material. The liners 28, 30, 32 may further be blow molded plastic, or injection molded plastic.

Referring to FIG. 3, the lobes 46, 48 of the respective flanking liners 28, 30 may be substantially identical and are arranged such that the lobe 46 of the first flanking liner 28 is rotated about one-hundred and eighty (180) degrees relative to the lobe 48 of the opposite flanking liner 30 (i.e., are arranged as a mirror image of one-another). Each flanking lobe 46, 48 may include a generally cylindrical outer portion or wall 60 and an interior portion or wall 62. The interior wall 62 may be substantially planar and may laterally span between a first end 64 and a second end 66 of the cylindrical outer wall 60. In one embodiment, the interior wall 62 is integrally formed with the ends 64, 66 of the cylindrical outer wall 60. At least a portion of the curvature of the cylindrical outer wall 60 is defined by a radius R. In one embodiment, the portion of the outer wall 60, opposite the interior wall 62, includes a circular shape or curve generally of a two-hundred and forty (240) degree angle as defined by the radius R. Consequently, the overall height of the flanking lobes 46, 48 is equal to double the length of the radius R of the cylindrical outer wall 60. The vertical interior wall 62 is generally parallel to and spaced apart from a vertical plane P that includes the origin of the radius R that defines the curvature of the outer wall 60. In one embodiment, the distance between the interior wall 62 and the parallel vertical plane P is about half the length of the radius R if the Y-joint is about one-hundred and twenty (120) degrees. As a result, the flanking lobes 46, 48 generally have a width equal to about one and a half the length of the radius of curvature R of the outer wall 60.

The illustrated interior lobe 58 includes first and second interior sidewalls 68, 70 that may be diametrically opposite one another, substantially vertically arranged (i.e., per the perspective of FIG. 3), and separated from one another by a distance. In one embodiment, the width of the interior lobe 58 is generally equal to the radius of curvature R of the end lobes 46, 48. The thicknesses of the first interior sidewall 68 and the second interior sidewall 70 may be identical and may be equal to the thickness of the interior wall 62 of the flanking lobes 46, 48. A first outside wall 72 extends between a first end 74 of the first interior sidewall 68 and a first end 76 of the second interior sidewall 70. Similarly, a second outside wall 78 extends between a second end 80 of the first interior sidewall 68 and a second end 82 of the second interior sidewall 70.

The curvature of the first outside wall 72 and the second outside wall 78 may be defined by a circular shape or curve generally of a sixty (60) degree angle by a radius R. In one embodiment, the radius of curvature R of the interior lobe 58 is substantially identical to the radius of curvature R of the flanking lobes 46, 48. Consequently, the distance between the first curved wall 72 and the second curved wall 78 is double the length of the radius of curvature R, and is therefore, substantially equal to the height of the flanking lobes 46, 48.

Figure 4:
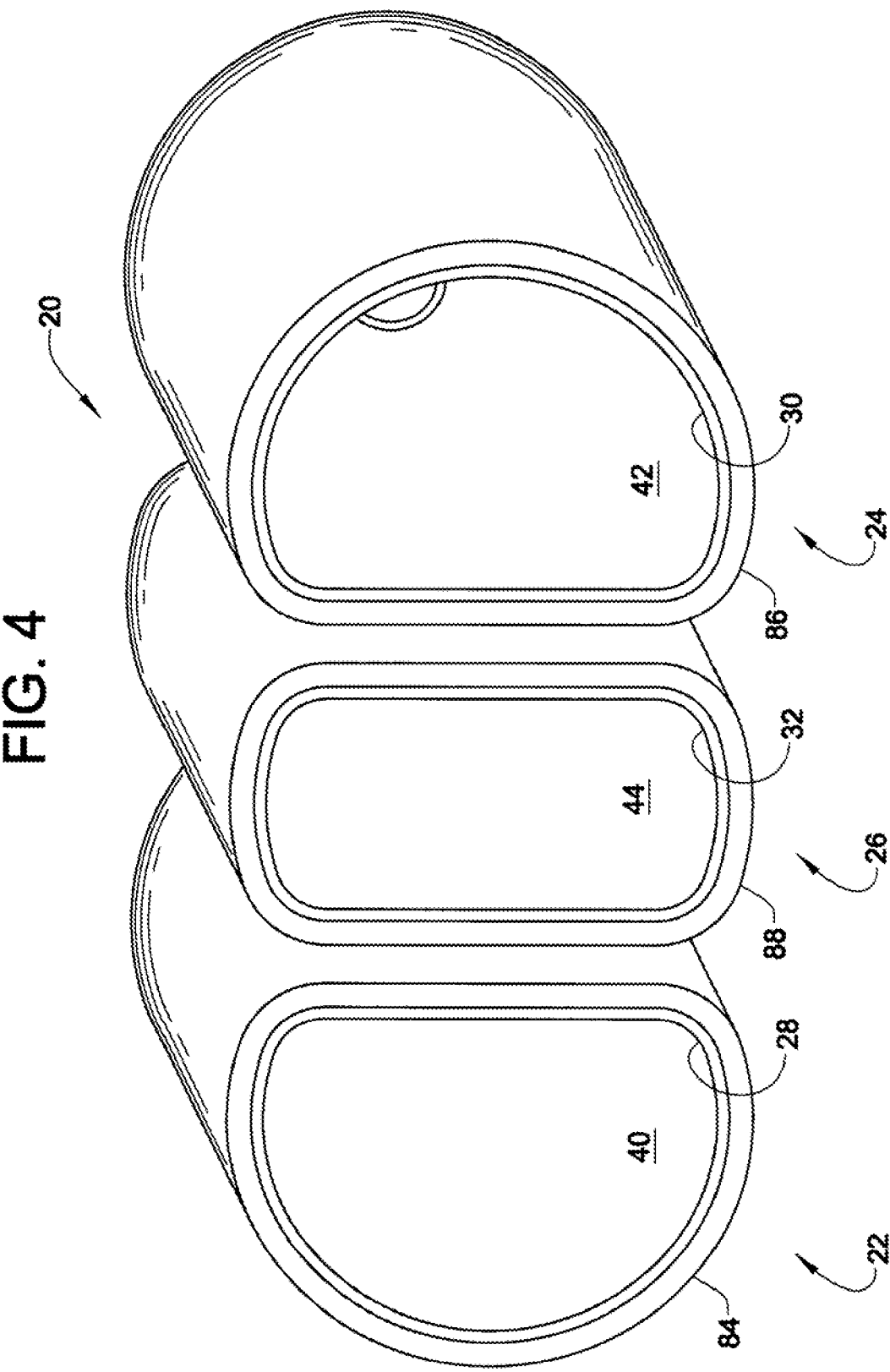
FIG. 4 is a perspective cross section of the liners with a mid-layer applied.

Referring to FIG. 4, the vessels 22, 24, 26 each include a mid-layer 84, 86, 88 that substantially covers the respective liners 28, 30, 32. The mid-layer 84 may be a continuous fiber wrapping or prepregs (i.e., fiber with resin) wrapped about the lobes and end caps of the liners for structural strength and for distributing internal stress. Alternatively, the mid-layers 84, 86, 88 may include a braiding that wraps about the respective liners 28, 30, 32. The primary reinforcement (i.e., the fibers or braiding), may be made of a carbon fiber, a glass fiber or an aramid fiber. A matrix material or resin for binding the continuous fibers may include epoxy, vinyl ester and other resin systems that may be nano-enhanced. It is further contemplated and understood that the mid-layers 84, 86, 88 may comprise other materials and/or processes including automated fiber placement, winded filaments, and/or a mixture of continuous and non-continuous fiber.

When the composite vessel assembly 20 is at least partially assembled, the interior wall 62 of the flanking lobe 46 is opposed and in proximity to the interior sidewall 68 of the interior lobe 58. The portion of the mid-layer 84 covering the interior wall 62 may be directly adjacent to the portion of the mid-layer 88 that covers the sidewall 68. Moreover, the portion of the mid-layer 84 covering the interior wall 62 may be bonded to the portion of the mid-layer 88 that covers the sidewall 68 if, for example, prepeg is applied. Similarly, the interior wall 62 of the flanking lobe 48 is opposed and in proximity to the interior sidewall 70 of the interior lobe 58. The portion of the mid-layer 86 covering the interior wall 62 may be directly adjacent and adhered to the portion of the mid-layer 88 that covers the sidewall 70.

Figure 5:
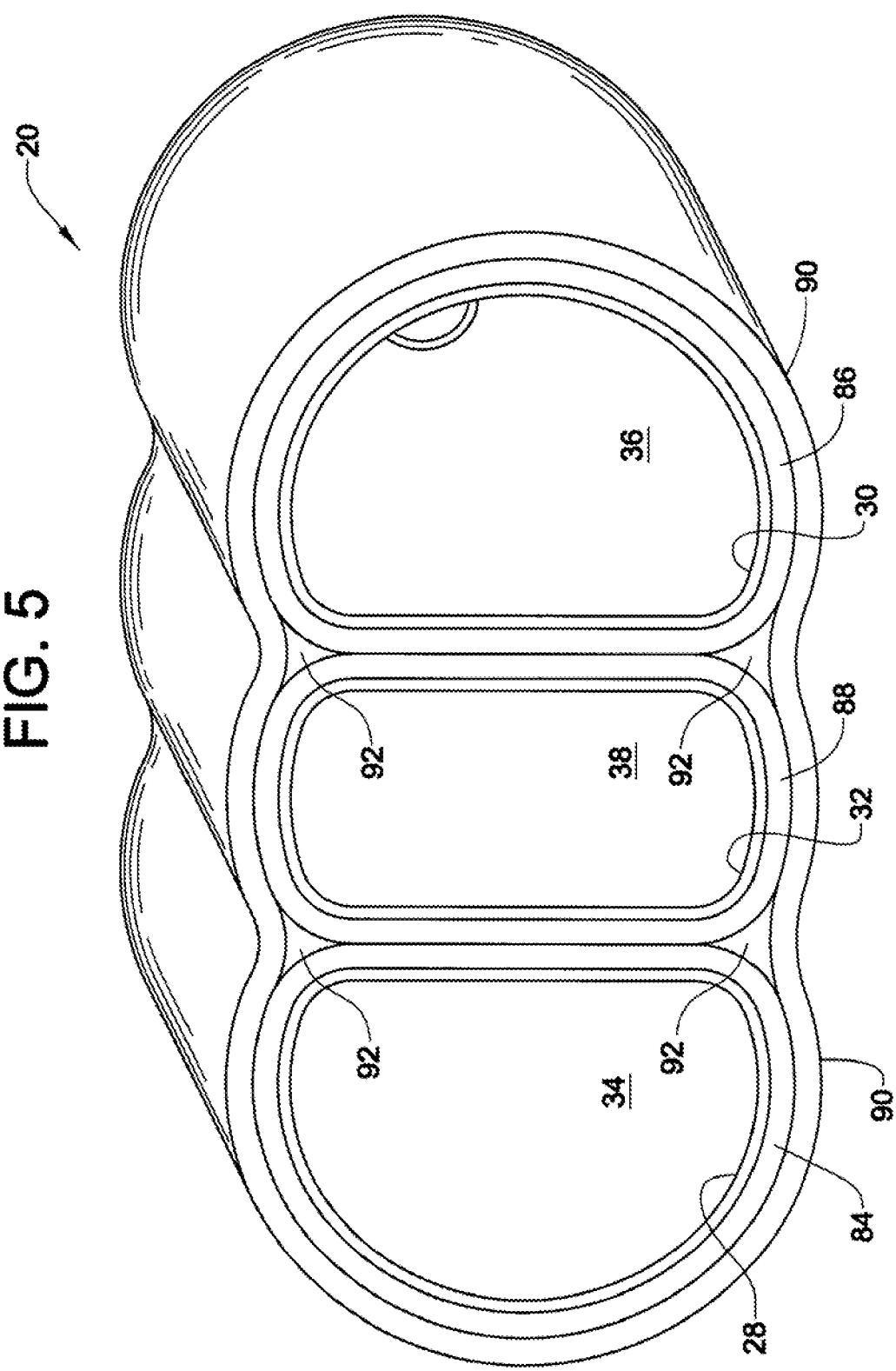
FIG. 5 is a perspective cross section of the pressure vessel assembly.

Referring to FIG. 5, the composite vessel assembly 20 may include an outer layer 90 that generally covers and envelops the mid-layers 84, 86, 88. The outer layer 90 may be applied after the mid-layers 84, 86, 88 are joined. The outer layer 90 may be a mixture of a non-continuous (e.g., chopped) fiber and resin that may be spray applied (i.e., spray chop fiber/resin) or may be a sheet molding compound (SMC). The primary reinforcement (i.e., the chopped fibers), may be made of a carbon fiber, a glass fiber or an aramid fiber of about one (1) inch in length (2.5 cm). The resin for binding the chopped fibers may include epoxy, vinyl ester and other resin systems that may be nano-enhanced.

The composite vessel assembly 20 may further include a plurality of junctions 92 with each junction located where respective ends of the outer walls 60, 72, 78, ends of the sidewalls 68, 70, and ends of interior walls 62 generally meet. Each junction 92 may generally be Y-shaped (i.e., a three pointed star) and may be made of the same material as the outer layer 90.

Because of the use of the continuous fiber in the mid-layers 84, 86, 88, the vessel assembly 20 weight is much lighter than if the entire assembly were made with a chopped fiber. However, the internal structural sidewalk 68, 70 and internal walls 62 have different mechanical properties from the outer walls 60, 72, 78 with the hybrid of continuous fiber and chopped fiber. For this embodiment of hybrid composite wall construction, the internal structural sidewalls 68, 70 and internal walls 62 may have a higher or lower effective stiffness than the hybrid outer walls 60, 72, 78, and therefore the junctions 92 will require an optimized angle that is different from about one-hundred and twenty (120) degrees that would typically be derived from homogeneous materials. The junction 92 angle and the internal wall thickness will be optimized base on specific material properties and hybrid wall construction.

Figure 6:
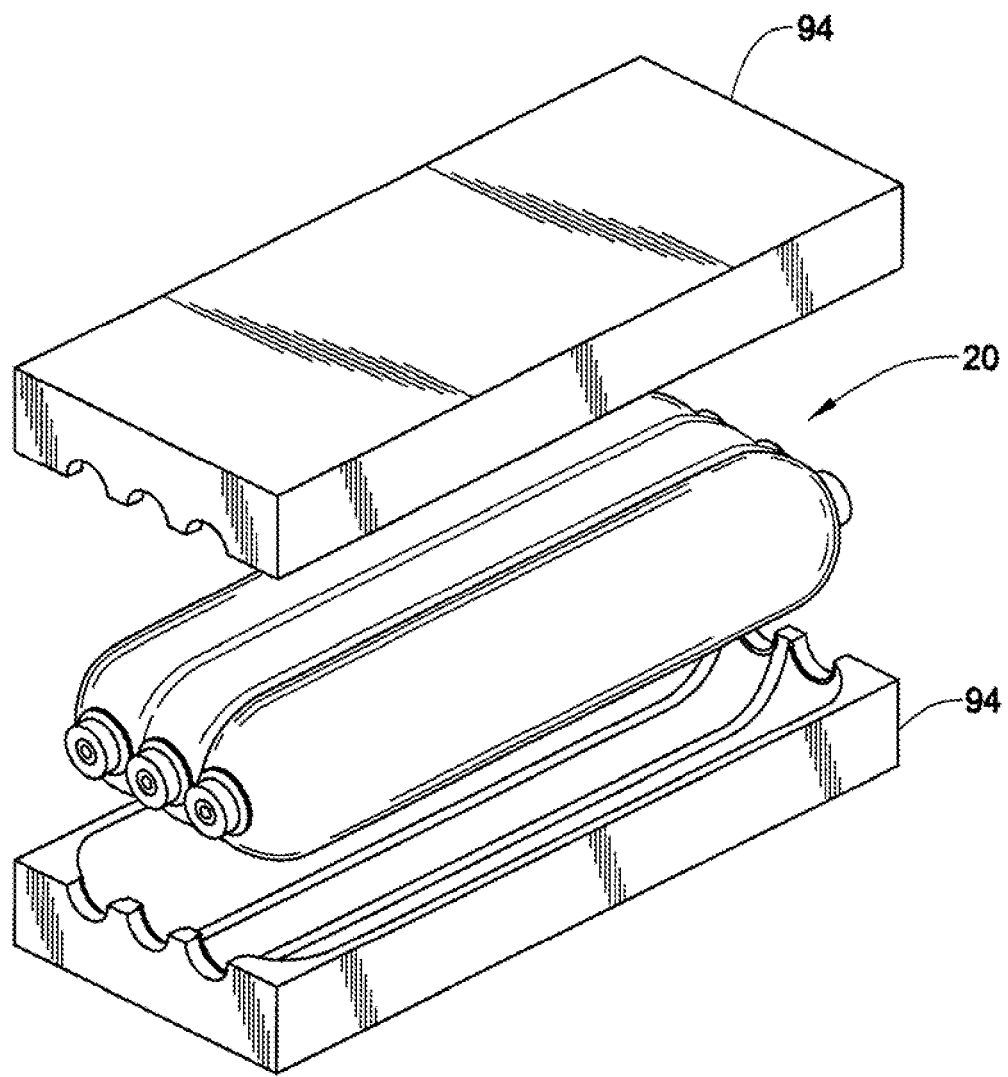
FIG. 6 is a perspective view of the pressure vessel assembly in conjunction with a pre-formed curing mold.

Referring to FIG. 6, after the outer layer 90 is applied, the composite pressure vessel assembly 20 may be placed in a pre-formed pressure mold 94. Once in place, the chambers 40, 42, 44 defined by the respective liners 28, 30, 32 may be pressurized and the resins of the mid and outer layers 84, 86, 88, 90 allowed to cure under heat. It is further contemplated and understood that other curing methods for the outer layer may be applied such as, for example, an autoclave or oven.

The composite pressure vessel assembly 20 may provide a lightweight storage tank(s) with a high energy storage density. The approach enables the easy addition of reinforcing composite material where needed (e.g. junctions 92). The use of the hybrid continuous and short fiber may further minimize the vessel assembly weight. Because the vessel assembly 20 is in a non-cylindrical shape, the assembly will provide the highest conformability to a given space. Moreover, the composite construction will also provide corrosion resistance compared to metallic tanks.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A composite pressure vessel assembly comprising:
    a first vessel including a first liner defining a first chamber, and a first mid-layer substantially enveloping the first liner;
    a second vessel including a second liner defining a second chamber, and a second mid-layer substantially enveloping the second liner, and wherein the first and second vessels are aligned side-by-side with a portion of the first mid-layer in contact with a portion of the second mid-layer, wherein each of the first and second liners include a lobe having at least one interior wall and at least one curved wall;
    an outer layer being in contact with and substantially enveloping the first and second mid-layers except for the portion of the first mid-layer in contact with the portion of the second mid-layer; and
    a plurality of junctions disposed where the respective ends of the curved walls and interior walls of the first and second liners meet, wherein the plurality of junctions are enveloped by the outer layer,
    wherein the outer layer is concave relative to an exterior of the pressure vessel at a meeting of a first interior wall of the first vessel and a second interior wall of the second vessel; and
    wherein the first and second mid-layers are made of a first composite comprising resin and a material selected from the group comprising continuous fiber wrapping, winded filaments, and a mixture of continuous and non-continuous fiber; and wherein the outer layer is made of a second composite comprising sprayed chopped fiber and resin upon the first composite of the first and second mid-layers, wherein the first composite differs from the second composite.

2. The composite pressure vessel assembly set forth in claim 1, wherein the portions of the first and second mid-layers which are in contact with each other cover the respective interior walls.

3. The composite pressure vessel assembly set forth in claim 2, wherein each of the first and second liners include a plurality of end caps disposed at the ends of the lobes.

4. The composite pressure vessel assembly set forth in claim 3, wherein the first and second liners are made of formable structural polymer material configured to provide structural support to the first vessel and the second vessel respectively.

5. The composite pressure vessel assembly set forth in claim 3, wherein the first and second liners are metallic.

6. The composite pressure vessel assembly set forth in claim 2, wherein the plurality of junctions are made of the same material as the outer layer.

7. The composite pressure vessel assembly set forth in claim 1, wherein the resins of the mid-layer and the outer layer are selected from a group comprising epoxy and vinyl ester.

8. The composite pressure vessel assembly set forth in claim 1, wherein the mid-layer and the outer layer include fibers made of a material selected from a group comprising carbon, glass, and aramid.

* * * * *